United States Patent [19]
Wright

[11] Patent Number: 5,891,530
[45] Date of Patent: Apr. 6, 1999

[54] METHOD FOR PRODUCING A COATING

[75] Inventor: Robin E. Wright, Inver Grove Heights, Minn.

[73] Assignee: Minnesota Mining and Manufacturing Company, St. Paul, Minn.

[21] Appl. No.: 635,116

[22] Filed: Apr. 19, 1996

[51] Int. Cl.$^6$ ........................................... C08J 7/04
[52] U.S. Cl. .................. 427/515; 427/208.4; 427/385.5; 427/387; 427/508; 427/516; 427/558; 427/559; 427/581
[58] Field of Search ..................... 427/508, 515, 427/516, 558, 559, 581, 208.4, 387, 385.5

[56] References Cited

U.S. PATENT DOCUMENTS

| | | | |
|---|---|---|---|
| 4,348,454 | 9/1982 | Eckberg | 427/515 X |
| 4,364,809 | 12/1982 | Sato et al. | 204/159 |
| 4,379,201 | 4/1983 | Heilmann et al. | 428/345 |
| 4,726,964 | 2/1988 | Isobe et al. | 427/515 |
| 4,748,043 | 5/1988 | Seaver et al. | 427/30 |
| 4,770,942 | 9/1988 | Itoh et al. | 427/515 X |
| 4,971,831 | 11/1990 | Ohba et al. | 427/515 X |
| 5,091,483 | 2/1992 | Mazurek et al. | 525/477 |
| 5,125,998 | 6/1992 | Jones et al. | 427/515 X |
| 5,139,815 | 8/1992 | Patterson | 427/515 |
| 5,326,598 | 7/1994 | Seaver et al. | 427/473 |
| 5,370,936 | 12/1994 | Kaiya | 427/515 X |
| 5,391,405 | 2/1995 | Irifune et al. | 427/515 |
| 5,486,578 | 1/1996 | Carpenter et al. | 427/515 X |

FOREIGN PATENT DOCUMENTS

| | | | |
|---|---|---|---|
| 0 125 114 A2 | 11/1984 | European Pat. Off. | C08L 83/04 |
| 0 426 198 A2 | 5/1991 | European Pat. Off. | C09J 4/02 |
| 0 604 738 A1 | 7/1994 | European Pat. Off. | B32B 31/00 |
| 44 06 978 A1 | 9/1995 | Germany | C08F 220/04 |
| WO 93/09152 | 5/1993 | WIPO | C08F 20/18 |
| WO96/40833 | 12/1996 | WIPO | C09J 7/02 |

OTHER PUBLICATIONS

Kitamura et al., *Applied Surface Science*, 79/80 (1984). 507–513. (No month avail.).

Kogelschatz, *Applied Surface Science*, 54(1992), 410–423. (No month avail.).

Bergonzo et al., *Applied Surface Science*, 69(1993), 393–397. (No month avail.).

Kogelschatz et al., *ABB Review*, 3(1991). 21–28. (No month avail.).

Zhang et al., *Journal of Adhesion Science and Technology*, 8(10)(1994), 1179–1210. (No month avail.).

R.W. Stowe, *Practical Relationships Between UV Lamps and the UV Curing Process "Window"*, Fusion UV Curing Systems, Rockville, Maryland, Published in *Conference Proceedings*, RadTech International North America, May, 1994, 307–313.

"*Photochemistry Aspects of Spectral Distributions and High Peak Irradiance,*" S. Jönsson and J. Hultgren (Mar., 1995).

"*The Criticality of Peak Irradiance (Light Intensity) as it Relates to Efficient UV Curing*," B. Schaeffer, S. Jönsoon & M. Amin (Mar., 1995).

"*FreeRadical Induced Polymerization Initiated by Decay Reactions from Photoexcited state Monomers or Exciplexes,*" S. Jönsson, B. Schaeffer, P. Sundell, M. Shimose, J. Owens &C. Hoyle (Mar., 1995).

"*Adhesion of Radiation Curable Monomers to Solid Polymer Surfaces,*" S. Jönsson (Mar., 1995).

R.W. Stowe, *Recent Developments in Microwave Energised UV Curing Lamps,* Rusion UV Curing Systems, Rockville, Maryland, Oct., 1992.

New Product News, "Dielectric Barrier Discharge Excimer Lamp," Nov. 1993, Ushio Inc.

*Primary Examiner*—Bernard Pianalto

[57] ABSTRACT

Methods of producing release coatings, adhesives, primers, and other polymeric coatings are described. A method for producing a release coating on a substrate comprises the steps of applying a polymerizable composition comprising a free radically polymerizable ethylenically unsaturated polysiloxane to a surface of a substrate, and exposing the polymerizable composition to a monochromatic light source having a peak intensity at a wavelength of between about 160 nanometers to 240 nanometers to form a release coating. Methods for producing a pressure sensitive adhesive and other polymeric coatings using a monochromatic light source are also described.

24 Claims, No Drawings

METHOD FOR PRODUCING A COATING

FIELD OF THE INVENTION

The invention relates to the production of coatings, and particularly to the production of release, adhesive, primer, or other polymeric coatings using monochromatic ultraviolet light sources.

BACKGROUND OF THE INVENTION

The free radical polymerization of ethylenically unsaturated monomers is known. Polymers formed by this mechanism from monomers or oligomers having acrylic, methacrylic, vinyl ester and styrenic functionalities are major constituents in many films and coatings, including protective coatings, release coatings, adhesives and inks. Polymerization typically involves the use of an added compound—an "initiator"—that initiates the reaction of and chain formation by such monomers. When free-radical initiators are used, the initiation step consists of two reactions. In the first reaction, the initiator undergoes cleavage or dissociation upon exposure to a source of radiation (e.g., heat, ultraviolet light, etc.), causing the formation of a radical species of the initiator. In a second step, this radical then combines with a first monomer to form a chain initiating species of the polymer. Once formed, this chain initiating radical propagates the polymerization reaction, incorporating other monomers into a growing polymer chain.

When electromagnetic radiation is the source of energy used to initiate and polymerize free radically reactive monomers, initiators that absorb light and form radical species when exposed to energy in the ultraviolet to visible range (250 to 700 nm) are typically employed. These photoinitiators may be organic, organometallic, or inorganic compounds, but are most commonly organic in nature. Examples of commonly used organic free radical photoinitiators include benzoin and its derivatives, benzil ketals, acetophenone, acetophenone derivatives, and benzophenone derivatives.

While effective in the free radical polymerization of these monomers, the use of photoinitiators can often compromise the properties and purity of the polymerized material. Determining the optimal concentration of photoinitiator, particularly in thicker coatings, often requires making concessions between critical factors such as polymerization rate, curing at the surface or the bulk curing of the coating, and/or limiting the level of unreacted or residual monomers or photoinitiators. For example, lower photoinitiator levels tend to reduce residual photoinitiator content and allow the penetration of light through the depth of the coating, but also reduce the cure rate of the coating or film. Higher photoinitiator levels promote cure rate and surface cure of photopolymerized coatings, but potentially lead to incomplete polymerization of the coating's bulk and unacceptably high levels of residual photoinitiator. The presence of such residual photoinitiators and photoinitiator by-products is known to affect both the potential commercial applications and long term stability of photopolymerized coatings made in this manner.

Alternatively, electron beam radiation may be used to induce formation of radical species which can initiate chain growth and polymer formation. While electron beam cured coatings do not require addition of photoinitiators, several disadvantages of such coatings are well known. Cost to purchase and operate an electron beam is significantly greater than an ultraviolet source. In addition, electron beams are much less selective than ultraviolet light. Whereas light must be absorbed by a species for reaction to proceed, response of a material to an electron beam is only dependent on atomic number and a multitude of reaction pathways often are available. Further, depth of cure is limited by the specific energy of the electrons, usually restricting cure to depths of less than 0.005 dm. Substrate damage is also a concern in the use of electron beams because many common substrates are adversely affected by exposure to electrons.

Most commercial and research applications using free radically photopolymerizable monomers employ mercury vapor lamps to excite photoinitiators and propagate polymer chain growth, due to the relatively high efficiency, ease of operation, universal availability, and low cost of such lamps. Commonly available medium pressure mercury vapor lamps emit a broad spectrum of radiation across the ultraviolet and visible light ranges, and peak in intensity at emission ranges of 250 to 260 nanometers (nm) and 350 to 380 nm, depending on internal pressure within the bulb. Although formulations of photoinitiator and monomers generally are tailored to polymerize at these peak emissions, radiation at other wavelengths in this emission spectrum can result in undesired and deleterious properties in films and coatings polymerized using such mercury vapor lamps.

Recently, new ultraviolet light sources have become available which can deliver a monochromatic or narrow band output based upon excimer formation that occurs in certain noble gases or noble gas/halogen mixtures when exposed to high energy. The wavelengths of the emissions from these sources depend on the gases employed. For example, excimer sources containing xenon gas emit at a wavelength of 172 nm, xenon chloride excimer sources have a narrowband emission at 308 nm, and krypton chloride excimer sources generate ultraviolet radiation at 222 nm. Descriptions of the mechanisms by which these devices operate and the configurations of these devices are reviewed in Kitamura et al., *Applied Surface Science,* 79/80(1984), 507–513; German Patent Appl. DE 4,302,555 A1 (Turner et al.); and Kogelschatz et al., *ABB Review,* 3(1991), 21–28.

Excimer lamps have been used in the modification and microstructuring of polymer surfaces and the photodeposition of various coatings on metal, dielectric and semiconductor surfaces. Examples of these applications can be found in Kogelschatz, *Applied Surface Science,* 54(1992), 410–423, and Zhang et al., *Journal of Adhesion Science and Technology,* 8(10)(1994), 1179–1210.

European Patent Appl. EP 604738 A1 (Nohr et al.) describes a method of preparing a laminate which involves coating a cationically curable adhesive composition onto the surface of a first sheet, exposing the adhesive composition to ultraviolet radiation form an excimer lamp having a narrow wavelength band within the range of about 260 to about 360 nm, and bringing the surface of a second sheet in contact with the adhesive composition-bearing surface of the first sheet. The adhesive composition includes about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer (based on the weight of the adhesive composition).

A process for producing coatings that improves upon mercury vapor lamp-based processes would be highly advantageous. It would be especially desirable to provide a free radical polymerization method for coatings that is initiator-free and which would thus yield coatings free of the residual initiator or initiator byproducts found in free radically polymerized materials prepared by other known methods.

SUMMARY OF THE INVENTION

In one aspect, the present invention features a method for producing a release coating on a substrate. The method includes the steps of applying a polymerizable composition containing free radically polymerizable ethylenically unsaturated polysiloxane to a surface of a substrate, and irradiating the polymerizable composition with a monochromatic light source having a peak intensity at a wavelength of between about 160 nm to 240 nm to form a release coating.

In preferred embodiments, the method includes applying the polymerizable composition at a thickness of about 0.1 micron to about 500 microns prior to irradiating the polymerizable composition with the monochromatic light source.

In other preferred embodiments, the polymerizable composition contains a photoinitiator.

In preferred embodiments, the polymerizable composition may contain acrylated polysiloxanes; alternatively, the polymerizable composition may consist essentially of free radically polymerizable ethylenically unsaturated polysiloxanes, or it may consist essentially of free radically polymerizable ethylenically unsaturated monomers. In still other embodiments, the polymerizable mixture may further include one or more comonomers which may be selected from the group consisting of monofunctional, difunctional, and polyfunctional acrylate, methacrylate, and vinyl ester monomers and oligomers. Preferably, the comonomers are selected from the group consisting of difunctional and polyfunctional acrylate and methacrylate monomers and oligomers.

The peak intensity of the monochromatic light source preferably is at a wavelength in the range of about 200 to 230 nanometers. In preferred embodiments of the invention, the monochromatic light source is an excimer lamp, and more preferably is a krypton chloride excimer lamp. Thus, in preferred embodiments, the irradiating step includes irradiating the polymerizable mixture using a monochromatic light source having a peak intensity at a wavelength of about 222 nm.

In preferred embodiments of the invention, the aged release value as measured by peel adhesion is less than 50 percent greater than the unaged release value.

The invention further features a release coating produced in accordance with the method of the invention.

In another aspect, the invention features a method for producing a pressure sensitive adhesive. This method includes the steps of providing a polymerizable composition containing a free radically polymerizable ethylenically unsaturated monomer and irradiating the polymerizable composition with a monochromatic light source having a peak intensity at a wavelength of between about 160 nm to about 240 nm to form a pressure sensitive adhesive.

In preferred embodiments, the pressure sensitive adhesive is a repositionable adhesive.

The polymerizable composition may contain a photoinitiator; alternatively, the polymerizable composition may consist essentially of free radically polymerizable ethylenically unsaturated monomers. The polymerizable composition may be applied at a thickness of between about 0.1 micron to about 500 microns prior to irradiation with the monochromatic light source.

In another aspect, the invention features a method for producing a coating on a substrate. The method includes the steps of applying a polymerizable composition containing a free radically polymerizable ethylenically unsaturated monomer to a surface of a substrate, and irradiating the polymerizable composition with a krypton chloride excimer lamp to form a polymeric coating.

In preferred embodiments, the polymeric coating may be a primer for an adhesive; in other embodiments, the polymeric coating may be a pressure sensitive adhesive. The pressure sensitive adhesive may be a repositionable adhesive. The polymeric coating may also be a release coating.

In another aspect, the present invention relates to a release coating containing the polymerization product of a polymerizable composition consisting essentially of acrylated polysiloxanes, wherein the release coating has a release force of less than about 1.6 Newtons per decimeter.

In another aspect, the invention features a release coating containing the polymerization product of a polymerizable composition consisting essentially of free radically polymerizable ethylenically unsaturated monomers, wherein the release coating has a release force of less than about 1.6 Newtons per decimeter.

As used herein, the term "monomer" refers to both ethylenically unsaturated monomers and oligomers.

A monochromatic radiation source is one which emits radiation over a narrow spectral range, for example, radiation having a half width of no more than about 50 nm, preferably about 5 to 15 nm.

As used herein, the term "polymerizable composition" refers to any material or combination of materials capable of polymerization upon exposure to a monochromatic light source as defined herein, and may include monomers, other pre-polymer material, or other additives selected to provide desired properties to the polymerized adhesive or coating.

DETAILED DESCRIPTION OF THE INVENTION

In accordance with the present invention, a polymerizable composition containing an ethylenically unsaturated free radically polymerizable monomer is exposed to a monochromatic light source to produce a coating. The type of polymeric coating produced by the method of the invention depends on the materials contained in the polymerizable composition. The polymeric coatings produced in accordance with the present invention may include release coatings, pressure sensitive adhesives, primers for adhesives, and the like.

In general, the ethylenically unsaturated free radically polymerizable monomers employed in this invention are vinyl-functional starting materials. Such vinyl starting materials include but are not limited to acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof, and other vinyl monomers polymerizable by free-radical means.

Preferably, the ethylenically unsaturated free radically polymerizable monomers have extinction coefficients at the peak intensity wavelenth of the light source (as determined by standard Beer's Law calculations) of less than about 1000, preferably less than about 200, and have the following general structure (Formula I):

wherein X is an ethylenically unsaturated free radically reactive functional group, m is a number of at least one, and Z is an m valent radical which is free of non-heterocyclic aromatic, chloro- and other moieties or substituents that significantly absorb ultraviolet radiation in the range of about 160 nm to about 240 nm. Absorption of radiation in these ranges by such moieties or substituents can interfere with the activation/excitation of the ethylenically unsaturated free radically reactive X group and thus prevent the free radical formation required to initiate and propagate the desired polymerization. These monomers may be mono-, di or polyfunctional (i.e., having one, two, or three or more free radically reactive functional X groups, respectively) and have X functional groups preferably selected from acrylate, methacrylate, and vinyl ester functionalities.

Monofunctional acrylate and methacrylate monomers useful in the method of the present invention include compositions of Formula I wherein X represents $H_2C=CR_1COO-$, $R_1$ represents $-H$ or $-CH_3$, m=1, and Z represents a monovalent straight chain alkyl, branched alkyl or cycloalkyl group having from about 1 to about 24 carbon atoms. Examples of such monofunctional acrylate and methacrylate monomers include but are not limited to those selected from the group consisting of methyl acrylate, methyl methacrylate, isooctyl acrylate, 4-methyl-2-pentyl acrylate, 2-methylbutyl acrylate, isoamyl acrylate, sec-butyl acrylate, n-butyl acrylate, tert-butyl acrylate, isobornyl acrylate, butyl methacrylate, ethyl acrylate, dodecyl acrylate, octadecyl acrylate, cyclohexyl acrylate and mixtures thereof.

Preferred acrylate monomers include those selected from the group consisting of isooctyl acrylate, isononyl acrylate, isoamyl acrylate, isodecyl acrylate, 2-ethylhexyl acrylate, isobornyl acrylate, n-butyl acrylate, sec-butyl acrylate, and mixtures thereof.

Vinyl ester monomers suitable for use in the process of the present invention include compositions of Formula I wherein X represents $H_2C=CH\ COO-$, m=1, and Z represents a monovalent straight chain or branched alkyl group having from about 1 to about 24 atoms. Such vinyl ester monomers include but are not limited to those selected from the group consisting of vinyl acetate, vinyl 2-ethylhexanoate, vinyl caprate, vinyl laureate, vinyl pelargonate, vinyl hexanoate, vinyl propionate, vinyl decanoate, vinyl octanoate, and other monofunctional unsaturated vinyl esters of linear or branched carboxylic acids comprising 1 to 16 carbon atoms. Preferred vinyl ester monomers include those selected from the group consisting of vinyl acetate, vinyl laureate, vinyl caprate, vinyl-2-ethylhexanoate, and mixtures thereof.

Monofunctional monomers which are readily copolymerizable with acrylate, methacrylate and vinyl ester monomers that are free of aromatic, chloro- and other moieties or substituents that significantly absorb ultraviolet radiation in the range of about 160 nm to about 240 nm and having an extinction coefficient (as determined by standard Beer's Law calculations) of less than about 1000 may also be used in the compositions of the present invention. Such monomers include but are not limited to those selected from the group consisting of acrylic acid, methacrylic acid, itaconic acid, crotonic acid, maleic acid, fumaric acid, sulfoethyl methacrylate, N-vinyl pyrrolidone, N-vinyl caprolactam, acrylamide, t-butyl acrylamide, dimethyl amino ethyl acrylamide, N-octyl acrylamide, acrylonitrile, mixtures thereof, and the like. Preferred monomers include those selected from the group consisting of acrylic acid, N-vinyl pyrrolidone, and mixtures thereof.

Free radically copolymerizable macromonomers of Formula I, wherein X is $H_2C=CR_1COO-$, $R_1$ represents $-H$ or $-CH_3$, m is 1, and Z is a monovalent polymeric or oligomeric radical having a degree of polymerization greater than or equal to 2 that is free of aromatic, chloro- and other moieties or substituents that significantly absorb ultraviolet radiation in the range of about 160 nm to about 240 nm may also be used in the polymerizable compositions of the present invention. Examples of such macromonomers include those selected from the group consisting of acrylate-terminated poly(methyl methacrylate), methacrylate-terminated poly(methyl methacrylate), acrylate-terminated poly(ethylene oxide), methacrylate-terminated poly (ethylene oxide), acrylate-terminated poly(ethylene glycol), methacrylate-terminated poly(ethylene glycol), methoxy poly(ethylene glycol) methacrylate, butoxy poly(ethylene glycol) methacrylate, and mixtures thereof. These functionalized materials are preferred because they are easily prepared using well-known ionic polymerization techniques and are also highly effective in providing grafted oligomeric and polymeric segments along free radically polymerized acrylate polymer backbones.

Useful difunctional and polyfunctional acrylate and methacrylate free radically polymerizable monomers include ester derivatives of alkyl diols, triols, tetrols, etc. (e.g., 1,4-butanediol diacrylate, 1,6-hexanediol diacrylate, trimethylolpropane triacrylate, and pentaerythritol triacrylate). Difunctional and polyfunctional acrylate and methacrylate monomers described in U.S. Pat. No. 4,379,201 (Heilmann et al.), such as 1,2-ethanediol diacrylate, 1,12-dodecanediol diacrylate, pentaerythritol tetracrylate can also be used in the present invention. Difunctional and polyfunctional acrylates and methacrylates including acrylated epoxy oligomers, acrylated aliphatic urethane oligomers, acrylated polyether oligomers, and acrylated polyester oligomers, such as those commercially available from UCB Radcure Inc, Smyrna, GA under the Ebecryl™ tradename and those available from Sartomer, Exton, PA, may also be employed.

Ethylenically unsaturated free radically polymerizable polysiloxanes, including especially the acrylated polysiloxane oligomers and polymers containing telechelic and/or pendant acrylate or methacrylate groups, are also examples of free radically polymerizable oligomers useful in the polymerizable compositions of the present invention. These (meth) acrylated polysiloxane oligomers can be prepared by a variety of methods, generally through the reaction of chloro-, silanol-, aminoalkyl-, epoxyalkyl-, hydroxyalkyl-, vinyl-, or silicon hydride-functional polysiloxanes with a corresponding (meth) acrylate-functional capping agent. These preparations are reviewed in a chapter entitled "Photopolymerizable Silicone Monomers, Oligomers, and Resins" by A. F. Jacobine and S. T. Nakos in Radiation Curing Science and Technology (1992), Plenum: New York, pp. 200–214. Preferred acrylated polysiloxane oligomers include those acryl-modified polydimethylsiloxane resins commercially available from Goldschmidt under the Tego™ RC designation and those acrylamido-terminated monofunctional and difunctional polysiloxanes described in U.S. Pat. No. 5,091,483 (Mazurek et al.).

Ultraviolet light sources useful in the method of the present invention are those having appreciable monochromatic spectral output in the region between about 160 nm to about 240 nm, preferably in the region between about 200 nm to about 230 nm. In these regions, conventional ultraviolet light sources such as mercury vapor lamps, black lights, tungsten lights and doped mercury lamps have minimal output. Examples of useful ultraviolet light sources include but are not limited to deuterium lamps, pulsed xenon sources, excimer lasers and excimer lamps. Preferred ultraviolet light sources are monochromatic excimer sources that are coherent, such as excimer lasers, or incoherent, such as excimer lamps. Excimer ultraviolet light sources are preferred due to their capacity to deliver narrowband, essentially monochromatic emissions to polymerization mixtures. For example, excimer lasers and lamps based on krypton chloride compositions have a primary output at 222 nm, a wavelength that promotes radical formation in the ethylenically unsaturated groups present in the monomers and oligomers of this process.

Examples of preferred excimer ultraviolet light sources include silent gas discharge lamps such as those commercially available from Heraeus (Hanau, Germany) and Ushio (Tokyo, Japan) and those described in Kogelschatz, *Applied Surface Science,* 54 (1992), 410–423, glow discharge lamps such as those described in EP Patent Appl. 521,553 (assigned to N. V. Philips), microwave driven lamps such as those described in Kitamura et al., *Applied Surface Science,* 79/80 (1994), 507–513 and DE 4302555 A1 (assigned to Fusion Systems), and excimer lamps pumped by a volume discharge with ultraviolet preionization as described in *Tech. Phys,* 39(10), 1054 (1994). Of these excimer lamps, silent gas discharge lamps based on KrCl are preferred because they are readily available, although other types of lamps may be desirable or available.

The intensities of incident radiation useful in the processes of the present invention can be from as low as about 1 mW/cm$^2$ to about 20 W/cm$^2$, preferably 5 mW/cm$^2$ to about 10 W/cm$^2$, more preferably 50 mW/cm2 to 2 W/cm$^2$. When higher power levels are provided (e.g., greater than about 20 W/cm$^2$), volatilization of low molecular weight ethylenically unsaturated monomers and oligomers can result. When laser-based ultraviolet light sources are used, such as excimer lasers, it is desirable to employ an optical device such as a lens to diffuse or spread the laser output to increase the effective irradiated area and reduce the energy density of the laser beam.

Advantageously, the method of the present invention does not require the use of a photoinitiator. As stated above, the use of photoinitiators in the polymerization of ethylenically unsaturated monomers and oligomers introduces added costs and undesirable residuals and byproducts to the process. Articles bearing coatings prepared using the preferred initiator-free method are of particular significance in medical applications, where photoinitiator-induced contamination of coatings can lead to skin irritation and other undesirable reactions. Exclusion of this component can result in significant direct cost savings, plus elimination of any expenses involved in qualifying products containing significant amounts of a photoinitiator.

In some applications, however, it may be desirable to include photoinitiators in reaction mixtures processed according to the methods of the present invention. Photoinitiators are particularly useful when higher polymerization rates or very thin coatings (or surface cures) are required. When used, photoinitiators can constitute from as low as about 0.001 to about 5 percent by weight of a polymerization mixture. These photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives.

In accordance with the method of the invention, the polymerizable composition comprising the ethylenically unsaturated monomer may be coated via any of a variety of conventional coating methods, such as roll coating, knife coating, or curtain coating. The low viscosity polymerization mixtures are preferably coated by means specifically adapted to deliver thin coatings, preferably through the use of precision roll coaters and electrospray methods such as those described in U.S. Pat. Nos. 4,748,043 and 5,326,598 (both to Seaver et al.). Higher viscosity mixtures which can be coated to higher thickness (e.g., up to about 500 μm) can be provided by selecting higher molecular weight oligomeric starting materials. oligomeric or polymeric starting materials can also be thickened with fillers such as silica and the like prior to exposure to the ultraviolet light source.

In a preferred method, thicker coatings may be prepared by partially polymerizing the ethylenically unsaturated monomers and oligomers along with an initiator using thermal or ultraviolet energy sources to form a coatable syrup. This syrup typically has a viscosity of between about 300 and 10,000 centipoise or higher depending on the coating methods used and the required coating thickness. The syrup can then be coated, either alone or with additional monomers and oligomers and/or photoinitiators, on a flexible or rigid substrate and exposed to the monochromatic light source. Such methods are particularly useful in preparing pressure-sensitive adhesive coatings.

These compositions may be applied to at least a portion of at least one major surface of a suitable flexible or rigid substrate or surface or backing and irradiated using the prescribed ultraviolet light sources. Useful flexible substrates include paper, plastic films such as poly(propylene), poly(ethylene), poly(vinyl chloride), poly (tetrafluoroethylene), polyester [e.g., poly(ethylene terephthalate)], polyamide film such as DuPont's Kapton™, cellulose acetate, and ethyl cellulose. Backings can also be of woven fabric formed of threads of synthetic fibers or blends of these. In addition, suitable backings may be formed of metal, metallized polymeric film, or ceramic sheet material. One of the advantages of the use of the ultraviolet light sources of the present invention is the ability to use such high energy, low heat sources to polymerize mixtures coated on heat sensitive substrates. Commonly used ultraviolet lamps often generate undesirable levels of thermal radiation that can distort or damage a variety of synthetic or natural flexible substrates. Suitable rigid substrates include but are not limited to glass, wood, metals, treated metals (such as those comprising automobile and marine surfaces), polymeric material and surfaces, and composite material such as fiber reinforced plastics.

The types and proportions of ethylenically unsaturated free radically polymerizable monomers used in the method of the invention depend on the desired properties and applications of the polymerized product. For example, if polymerization products having pressure-sensitive adhesive properties are required, then monomers should be combined by well known formulating techniques that result in products possessing sufficient viscoelastic and morphological properties to demonstrate adequate tack, peel and cohesive strength. Protective coatings having sufficient toughness and hardness can be prepared from these monomers and oligomers to produce high glass transition temperature, highly crosslinked materials. Specialty coatings, such as release coatings, can be formed by the techniques of the present invention from acrylated polysiloxane oligomers. The coatings prepared by the method of the invention are well suited for binders, primers and other coatings ranging in thickness from about 0.1 to about 500 μm.

A particularly useful coating derived from the method of the present invention involves the polymerization of acrylate pressure-sensitive adhesive formulations that have been syruped, coated and irradiated under a low oxygen atmosphere. Pressure-sensitive adhesive coatings prepared in this manner may exhibit a structured surface profile and diminished adhesive tack. These structured, low-tack coatings may be adhered to and easily removed from a variety of surfaces, including paper, glass, and metal, with no apparent transfer of adhesive to any of these surfaces. In this way, pressure-sensitive adhesives prepared by this process approach the performance of other repositionable adhesive articles which have been structured by alternative coating or chemical means. "Repositionable" refers to the ability to be repeatedly adhered to and removed from a substrate without substantial loss of adhesion capability. Such adhesives are tacky but exhibit low peel adhesion properties, thus allowing repeated reusability. A coating made in accordance with the invention which may be classified as repositionable is described below in example 21.

Another particularly useful coating derived from the method of the present invention involves the polymerization of acrylated polysiloxanes to form release coatings under low oxygen atmosphere. The use of silicone release coatings has been an industry standard for many years, and is widely employed by liner suppliers and large, integrated tape manufacturers. Release coatings prepared in this manner may exhibit any desired level of release, including (1) premium or easy release, (2) moderate or controlled release, or (3) tight release; premium release requires the least amount of force. Premium release coatings (i.e., those release coatings having aged release forces in the range of up to about 1.6 N/dm) are typically used in release liner applications. Premium release coatings are less useful, however, when coated on the back surface of pressure-sensitive adhesive tapes, because their low release force can cause tape roll instability and handling problems. Such a release coating on the back surface of a pressure-sensitive adhesive tape construction is often referred to as a "low adhesion backsize." Release coatings having moderate to high levels of aged release (about 6 to about 35 N/dm) are especially useful when used as low adhesion backsizes.

Polymerizable polysiloxane compositions suitable for use in the present invention to produce release coatings are commercially available from, for example, Goldschmidt Chemical Corporation under the TEGO name. These acrylated polysiloxane resins are pourable and may be blended for optimized properties such as level of release, adhesive compatibility, and substrate compatibility. An example of a blend recommended for achieving premium (easy) release is a 70:30 blend of TEGO RC726 and TEGO RC711.

In addition, polymerizable compositions containing acrylated polysiloxanes for use in the production of release coatings may include, as polymerizable constituents, 100% acrylated polysiloxanes or, alternatively may include free radically polymerizable diluents in addition to the acrylated polysiloxanes. Such non-polysiloxane free radically polymerizable diluents can be used to modify the release properties of the coatings of the present invention and also enhance the coating's mechanical properties and anchorage to backings or substrates used in pressure-sensitive adhesive tape or release liner constructions. Depending on the ultimate properties desired in the polymerized release coatings, useful non-polysiloxane free radically polymerizable diluents include the monofunctional, difunctional and polyfunctional acrylate, methacrylate and vinyl ester monomers and oligomers previously mentioned. Preferably, difunctional and polyfunctional acrylate and methacrylate monomers such as 1,4-butanediol diacrylate, 1-6-hexanediol diacrylate, trimethylolpropane diacrylate, and pentaerythritol triacrylate 1, 2-ethanediol diacrylate, 1, 12 dodecanediol diacrylate, trimethylolpropane triacrylate pentaerythritol tetracrylate and difunctional and polyfunctional acrylate and methacrylate oligomers including acrylated epoxy oligomers, acrylated aliphatic urethane oligomers, acrylated polyester oligomers, and acrylated polyethers such as those commercially available from UCB Radcure Inc. under the Ebecryl™ tradename and from Sartomer, Exton, PA, are employed. The difunctional and polyfunctional acrylate and methacrylate monomers and oligomers employed in these release coatings can be used at a concentration of from about 10 to about 95, preferably about 25 to 90 weight percent, based on the total weight of the release coating composition. Monofunctional monomers, such as the acrylate, methacrylate, vinyl ester and other free radically copolymerizable monomers listed above, can also be added as non-polysiloxane free radically polymerizable diluents in the release coating composition. When used, these monofunctional monomers may be employed as a concentration of up to about 25 weight percent based on the total weight of the release coating composition. Mixtures of monofunctional, difunctional and polyfunctional non-polysiloxane monomers and oligomers can also be used.

The invention may be illustrated by way of the following examples.

EXAMPLE 1

A blend of 60 parts of an aliphatic urethane acrylate diluted with 20% tripropylene glycol diacrylate (CN965A80, commercially available from Sartomer, Exton, Pa.) and 40 parts polyethylene glycol diacrylate having a molecular weight of approximately 400 (SR344, commercially available from Sartomer, Exton Pa.) was coated onto 125 micrometer sputter-etched polyester film using an air pressurized knife coater available from Euclid Tool and Die, Bay City, Michigan. The air pressure was set at 138 kPa to give a coating thickness of approximately 1 micrometer. The coated substrate was then passed once through a curing chamber at a speed of approximately 1.6 meters per minute under the output of a KrCl excimer lamp (Model 222, Heraeus Noblelight, Hanau, GE) in which the lamp was mounted on a conveyor belt system at a height of approximately 2.5 cm above the belt surface. The chamber of the conveyor system was nitrogen purged to an ambient oxygen level less than 100 ppm to minimize oxygen quenching of radical species and to reduce absorption of the bulb emission by the ambient atmosphere. Sample irradiance was measured using an International Light Model IL290B Radiometer (International Light, Newburyport, Mass.) which had been modified to give it enhanced sensitivity at 222 nm. Note that under these conditions, the radiometer was out of calibration and provided only a relative measure of the actual intensity. The irradiated coating was clear in appearance and, as an indication of polymerization, dry to the touch. To determine the degree of adherence of the polymerized coating to the polyester backing, the surface of the coating was rubbed with an isopropyl alcohol saturated cotton tipped applicator. Any significant degradation of the coating when rubbed with the applicator indicated poor anchorage of these coatings to the polyester film. For Example 1, rubbing with alcohol application showed no noticeable effect on the cured coating.

EXAMPLES 2–16

A variety of free-radically polymerizable compositions were blended, coated, irradiated and tested according to the methods of Example 1. When processed in this manner, all of these compositions formed dry, clear coatings. The composition of these examples, the line speeds at which they were processed, the number of passes of the sample under the excimer light source, and the results of coating characterization are recorded in Table 1.

| Ex. | Comp.(a) (parts) | Comp.(b) (parts) | Comp.(c) (parts) | Initiator (wt %) | Line Speed (m/min) | Passes | Alcohol Rub |
|---|---|---|---|---|---|---|---|
| 1 | CN 965A80 (60) | SR344 (40) | — | — | 1.6 | 1 | OK |
| 2 | CN 965A80 (60) | SR344 (40) | — | — | 6.5 | 1 | OK |
| 3 | CN 965A80 (60) | SR344 (40) | — | — | 13 | 1 | OK |
| 4 | CN 964E75 (100) | SR344 (100) | SR399 (0.07) | — | 8 | 1 | OK |
| 5 | SR480 (50) | SR604 (50) | — | Darocur 1173 (0.1) | 8 | 1 | OK |
| 6 | SR252 (50) | SR604 (50) | — | — | 8 | 1 | NO |
| 7 | SR252 (50) | SR604 (50) | — | — | 8 | 5 | NO |
| 8 | SR306 (100) | — | — | — | 8 | 1 | OK |
| 9 | CN 965A80 (50) | SR610 (50) | — | — | 8 | 1 | OK |
| 10 | CN 965A80 (47) | SR344 (47) | SR399(6) | — | 8 | 1 | NO |
| 11 | CN 120C80 (67) | SR238 (33) | — | — | 25 | 1 | OK |
| 12 | SR340 (33) | SR604 (33) | SR480 (33) | — | 25 | 1 | NO |
| 13 | CN 964E75 (100) | SR344 (100) | SR399 (7) | — | 25 | 1 | OK |
| 14 | CN 964E75 (100) | SR344 (100) | SR399 (7) | — | 25 | 1 | OK |
| 15 | CN 120C80 (80) | SR238 (20) | — | — | 25 | 1 | OK |
| 16 | CN 120C80 (80) | SR238 (20) | — | — | 25 | 2 | OK |

ABBREVIATIONS:
CN965A80-an aliphatic urethane acrylate diluted with 20% tripropylene glycol diacrylate commercially available from Sartomer, Exton, PA
CN120C80-an epoxy acrylate diluted with 20% trimethylpropane triacrylate commercially available from Sartomer, Exton, PA
CN964E75-an aliphatic urethane diacrylate diluted with 25% ethoxylated trimethylolpropane triacrylate commercially available from Sartomer, Exton, PA
Darocur 1173-
SR252-polyethylene glycol dimethacrylate having a molecular weight of approximately 600 commercially available from Sartomer, Exton, PA
SR306-an acrylic oligomer commercially available from Sartomer, Exton, PA
SR340-2-phenoxyethyl acrylate commercially available from Sartomer, Exton, PA
SR344-polyethylene glycol diacrylate having a molecular weight of approximately 400 commercially available from Sartomer, Exton, PA
SR399-dipentaerthyritol pentaacrylate commercially available from Sartomer, Exton, PA
SR480-bisphenol A dimethacrylate commercially available from Sartomer, Exton, PA
SR604-polypropylene glycol monomethacrylate commercially available from Sartomer, Exton, PA
SR610-polyethylene glycol diacrylate commercially available from Sartomer, Exton, PA
$^a$coated under air pressure of 103 kPa
$^b$coated under air pressure of 124 kPa The results of examples 1–16 demonstrate that a wide variety of oligomeric and monomeric blends of acrylate functionalized reagents are able to be cured by direct excitation at 222 nm.

EXAMPLE 17

A solution of 90 grams isooctyl acrylate and 10 grams acrylic acid was prepared. An aliquot of the solution was coated onto 0.005 cm thick polyester backing using a No. 3 wire wound bar. The final coating thickness was in the range of 10 microns or less, although the low viscosity of the solution made it difficult to get uniform coatings. The coated backing was then cured according to the method of example 1. After one pass, the coating was dry to the touch but had noticeable tack as shown by the aggressive behavior towards the tip of a cotton tipped applicator. The backing showed no damage as a result of the exposure. This example demonstrates that a pressure sensitive adhesive substantially free of any photoinitiator may be produced in accordance with the present invention.

Comparative Example C1

An identical coating was made from the solution of Example 17 onto the same polyester backing and the film passed under two 120 W/cm medium pressure mercury lamps in a nitrogen inerted RPC Processor (Fusion Systems, Gaithersburg, Md.). After a single pass at 3 meters/min, the coating was still wet. More significantly, there was a visible vapor cloud formed inside the inerted chamber due to localized heating from the lamps and subsequent volatization of monomer from the coating. A second pass under the lamps yielded a coating that was dry to the touch, but the tack was noticeably less than the excimer-cured coating of Example 17 as demonstrated by its less aggressive behavior toward a cotton tipped applicator. Due to the excess heat generated during this second pass under the mercury lamps the polyester backing became noticeably warped.

Comparative Examples C2–C3

The following comparative examples demonstrate the need for using free radically polymerizable monomers and oligomers in the reaction mixtures processed using the methods of the present invention. Polyepoxide resins ERL 4221 (3,4-epoxycyclohexylmethyl 3,4-epoxycyclohexane commercially available from Union Carbide—Comparative Example C2) and ERL 4299 (bis[(3,4-epoxy-6-methcyclohexyl)methyl] adipate polymer commercially available from Union Carbide—Comparative Example C3) were coated at a thickness of 1 micron on a polyester backing and irradiated according to the methods of Example 1. After 5 passes under the excimer light source, neither example cured.

EXAMPLE 18–20

Blends of TEGO RC726 (a high molecular weight acrylated polydimethylsiloxane commercially available from Goldschmidt Chemical Co., Hopewell, Va.), TEGO RC711 (a low molecular weight acrylated polydimethylsiloxane commercially available from Goldschmidt Chemical Co., Hopewell, Va.) and TEGO RC706 (a silicate tackifying resin commercially available from Goldschmidt Chemical Co., Hopewell, Va.) were prepared in the proportions found in Table II and coated according to the method of Example 1 but on polyproplyene. The coated backing was then passed twice through a curing chamber at a speed of approximately 1.6 meters per minute under the output of the source of Example 1.

Release values were obtained by casting a solvent based acrylic pressure-sensitive adhesive directly onto the cured coating surface, drying the pressure-sensitive adhesive at 70° C. for 5 minutes and laminating a 50 μm polyester film to the adhesive layer. "Initial" release (in Newtons/decimeter (N/dm)) is the force necessary to peel the polyester-adhesive layer at a rate of 2.3 meters/min from the release surface of the polymerized composition at a 180° angle after the laminate had been held at room temperature (25° C.) for three days. "Aged" release (in N/dm) is the force required to peel the polyester-adhesive layer from the release surface after the laminate had been held at 70° C. for three days. Readhesion values were obtained by measuring the force necessary to peel the polyester-adhesive layer at a rate of 2.3 meters/min from a glass plate at a 180° angle after the laminate had undergone "initial" and "aged" release testing.

Comparative Examples C4–C6

The following comparative examples demonstrate the effects of alternatively polymerizing the release coating compositions of Examples 18–20 also containing 2% Darocur 1173 (Ciba-Geigy) photoinitiator using an RPC Processor of Comparative Example C1. Photoinitiator-containing release coating reaction mixtures were prepared according to the proportions found in Table II and coated onto a polypropylene backing according to the method of Examples 18–20. The coated backing was then passed once through the RPC Processor at a speed of approximately 12.2 meters per minute. Samples of the coatings were release tested according to the methods described in Examples 18–20 and the results of these tests are recorded in Table II.

TABLE II

| Ex. | RC726 (parts) | RC711 (parts) | RC708 (parts) | Darocur 1173 (wt %) | Release, initial (N/dm) | Release, aged (N/dm) | Readhesion initial (N/dm) | Readhesion aged (N/dm) |
| --- | --- | --- | --- | --- | --- | --- | --- | --- |
| 18 | 70 | 30 | — | — | 0.23 | 0.35 | 52.2 | 53.5 |
| C4 | 70 | 30 | — | 2 | 0.31 | 0.54 | 50.3 | 53.4 |
| 19 | 60 | 40 | — | — | 0.46 | 0.42 | 51.0 | 55.2 |
| C5 | 60 | 40 | — | 2 | 0.31 | 0.60 | | 53.5 |
| 20 | 35 | 30 | 35 | — | 0.81 | 0.73 | 52.9 | 56.2 |
| C6 | 35 | 30 | 35 | 2 | 0.61 | 1.89 | 52.2 | 58.5 |

Table II illustrates the effects of photoinitiators and mercury lamps on the aged release performance of these coatings. Examples 18–20, polymerized without any photoinitiator using the excimer light source, demonstrate greater aging stability than Comparative Examples C4–C6. The release values for the comparatives increased significantly upon aging.

Comparative Examples C7–C9

Comparative Examples C-7 to C-9 demonstrate the use of an electron-beam source to polymerize a range of initiator-free blends of TEGO RC726 and TEGO RC711. These blends were prepared in the proportions found in Table III (where "pts" refers to parts) and coated according to the method of Examples 18–20. The coated samples were exposed to 2 Mrad using an Electrocurtain™ Model CB300 electron beam unit (available from Energy Sciences Inc., Wilmington, Del.). The electron-beam polymerized samples were then tested for initial and aged release and readhesion according to the methods of Examples 18–20. The results of these tests can be found in Table III.

TABLE III

| Ex | RC726 pts | RC711 pts | RC708 pts | Darocure 1173 (wt %) | Release, initial (N/dm) | Release, aged (N/dm) | Readhesion, initial (N/dm) | Readhesion aged (N/dm) |
|---|---|---|---|---|---|---|---|---|
| C-7 | 70 | 30 | — | — | 1.18 | 1.93 | 52.9 | 54.8 |
| C-8 | 50 | 50 | — | — | 1.96 | 3.25 | 56.5 | 52.5 |
| C-9 | 30 | 70 | — | — | 4.14 | 4.14 | 57.9 | 50.9 |

As can be seen in Table III, all of the initiator-free electron-beam polymerized comparative examples yielded release coatings that had higher release values than similar coatings polymerized using excimer lamps. This differential is best illustrated when the release values of the same formulation found in the electron beam polymerized Comparative Example C-7 is compared to the excimer polymerized Example 18. The release coating of Example 18 demonstrated premium initial and aged release levels and a moderate increase in release when aged, while the same formulation of Example C-7 exhibited higher initial and aged release levels and greater instability upon aging.

EXAMPLE 21

A partially polymerized acrylic pressure-sensitive adhesive composition was prepared by dissolving 0.04 wt-% photoinitiator (IRGACURE 651, commercially available from Ciba-Geigy) into a mixture of 90 wt-% isooctyl acrylate and 10 wt-% acrylic acid and irradiating the mixture with low intensity UV light until about 10% conversion was achieved. This composition was coated onto a 125 micrometer polyester backing to a thickness of 75 microns using a No. 40 Mayer rod. The coated backing was then passed three times through a curing chamber under the lamp according to Example 1. After three passes, the coating had a textured surface. When adhered to various surfaces, including glass, paper and polytetrafluorethylene, the structured adhesive was found to be easily removed and repositioned with no apparent transfer of adhesive to any of the test surfaces.

EXAMPLES 22–45

Examples 22–45 and Comparative Examples C10–C33 demonstrate the use of a monochromatic light source to polymerize a range of initiator-free blends of TEGO RC726, TEGO RC711 or TEGO RC706 (Goldschmidt Chemical Co., Hopewell, Va.) mixed with non-polysiloxane free radically polymerizable diluents. These blends were prepared in the proportions found in Table IV and coated onto polypropylene and polymerized according to the method of Examples 18–20, except that Examples 22–45 were cured at a speed of 3 meters/minute, while comparative Examples C10–C33 were cured at a speed of 15 meters/minute. The polymerized samples were then tested for release and readhesion according to the following test methods.

More specifically, in the release test a coated sample was firmly attached to a stainless steel test panel with conventional double-sided adhesive tape with the release surface of the coated sample exposed. A 0.25 dm by 2.5 dm piece of a conventional diaper tape (a tackified Kraton™-type block copolymer pressure sensitive adhesive on a polyolefin backing) was applied to the exposed release surface of the coated sample with one pass of a 100 gram rubber-covered, mechanically-operated roller. The stainless steel test panel was clamped into one jaw of a 90 degree tensile testing machine while one end of the pressure sensitive adhesive tape was clamped to the adhesion tester scale that was capable of separating the test panel and the tape at a constant rate of 0.3 meters per minute. The results of this test can be found in Table IV.

In the readhesion test, the conventional diaper tape from the release test, subsequent to removal from the coated release sample, was firmly adhered to a polyethylene surface with one pass of a 100 gram rubber-covered, mechanically-operated roller, and then tested in the tensile testing machine described in the release test and in the same manner. Readhesion values are reported below in Table IV as a percentage of the force required to remove the diaper tape from the polyethylene surface as compared to a control sample of the diaper tape which had not been first adhered to the coated release sample.

TABLE IV

| Ex. NO. | RC711 | RC726 | RC706 | SR256 | SR610 | 1173 | Bulb | Peel, N/dm | % Readhesion |
|---|---|---|---|---|---|---|---|---|---|
| 22 | 5 | | | 95 | | | 222 | 0.35 | 33 |
| 23 | | 5 | | 95 | | | 222 | 0.35 | 48 |
| 24 | | | 5 | 95 | | | 222 | 0.19 | 28 |
| 25 | 9 | | | 91 | | | 222 | 0.42 | 45 |
| 26 | | 9 | | 91 | | | 222 | 0.39 | 50 |
| 27 | | | 9 | 91 | | | 222 | 0.35 | 30 |
| 28 | 25 | | | 75 | | | 222 | 1.12 | 59 |
| 29 | | 25 | | 75 | | | 222 | 0.54 | 22 |
| 30 | | | 25 | 75 | | | 222 | 0.69 | 22 |
| 31 | 91 | | | 9 | | | 222 | 10.5 | 59 |
| 32 | | 90 | | 10 | | | 222 | 0.39 | 32 |
| 33 | | | 90 | 10 | | | 222 | 1.00 | 63 |
| C10 | 5 | | | 95 | | 3 | H | 0.97 | 41 |
| C11 | | 5 | | 95 | | 3 | H | 0.42 | 7 |
| C12 | | | 5 | 95 | | 3 | H | 0.42 | 5 |
| C13 | 9 | | | 91 | | 3 | H | 0.93 | 52 |
| C14 | | 9 | | 91 | | 3 | H | 0.46 | 8 |

TABLE IV-continued

| Ex. NO. | RC711 | RC726 | RC706 | SR256 | SR610 | 1173 | Bulb | Peel, N/dm | % Readhesion |
|---|---|---|---|---|---|---|---|---|---|
| C15 | | | 9 | 91 | | 3 | H | 1.08 | 14 |
| C16 | 25 | | | 75 | | 3 | H | 1.39 | 49 |
| C17 | | 25 | | 75 | | 3 | H | 0.50 | 8 |
| C18 | | | 25 | 75 | | 3 | H | 1.43 | 44 |
| C19 | 90 | | | 10 | | 3 | H | 8.11 | 54 |
| C20 | | 90 | | 10 | | 3 | H | 0.42 | 56 |
| C21 | | | 90 | 10 | | 3 | H | 0.97 | 62 |
| 34 | 5 | | | | 95 | | 222 | 9.96 | 59 |
| 35 | | 5 | | | 95 | | 222 | 23.34 | 55 |
| 36 | | | 5 | | 95 | | 222 | 8.15 | 60 |
| 37 | 10 | | | | 90 | | 222 | 10.66 | 61 |
| 38 | | 10 | | | 90 | | 222 | 18.30 | 52 |
| 39 | | | 10 | | 90 | | 222 | 7.10 | 60 |
| 40 | 25 | | | | 75 | | 222 | 9.96 | 86 |
| 41 | | 25 | | | 75 | | 222 | 11.58 | 49 |
| 42 | | | 25 | | 75 | | 222 | 4.94 | 62 |
| 43 | 90 | | | | 10 | | 222 | 6.87 | 54 |
| 44 | | 90 | | | 10 | | 222 | 0.27 | 20 |
| 45 | | | 90 | | 10 | | 222 | 1.20 | 58 |
| C22 | 5 | | | | 95 | 3 | H | 9.19 | 60 |
| C23 | | 5 | | | 95 | 3 | H | 28.88 | 57 |
| C24 | | | 5 | | 95 | 3 | H | 6.87 | 65 |
| C25 | 10 | | | | 90 | 3 | H | 6.17 | 61 |
| C26 | | 10 | | | 90 | 3 | H | 15.44 | 55 |
| C27 | | | 10 | | 90 | 3 | H | 5.95 | 75 |
| C28 | 25 | | | | 75 | 3 | H | 10.12 | 71 |
| C29 | | 25 | | | 75 | 3 | H | 15.06 | 60 |
| C30 | | | 25 | | 75 | 3 | H | 5.13 | 67 |
| C31 | 90 | | | | 10 | 3 | H | 5.33 | 60 |
| C32 | | 90 | | | 10 | 3 | H | 0.46 | 53 |
| C33 | | | 90 | | 10 | 3 | H | 1.39 | 65 |

The results of Table IV show a wide range in peel adhesion and comparable performance to comparative Examples which contain added photoinitiator. It is anticipated that addition of low molecular weight multifunctional comonomers will increase the percent readhesion.

Other embodiments of the invention are within the scope of the appended claims.

What is claimed is:

1. A method for producing a release coating on a substrate, comprising:

applying a polymerizable composition comprising a free radically polymerizable ethylenically unsaturated polysiloxane to a surface of a substrate; and irradiating said polymerizable composition with a monochromatic light source having a peak intensity at a wavelength of between about 160 nanometers to about 240 nanometers to form a release coating.

2. The method of claim 1, wherein said polymerizable composition is applied at a thickness of about 0.1 microns to about 500 microns prior to irradiation with said monochromatic light source.

3. The method of claim 1, wherein said polymerizable composition further comprises a photoinitiator.

4. The method of claim 1, wherein said polymerizable composition consists essentially of free radically polymerizable ethylenically unsaturated polysiloxanes.

5. The method of claim 1, wherein said polymerizable composition consists essentially of free radically polymerizable ethylenically unsaturated monomers.

6. The method of claim 1, wherein said peak intensity is at a wavelength between about 200 to about 230 nanometers.

7. The method of claim 1, wherein said free radically polymerizable ethylenically unsaturated polysiloxane comprises an acrylated polysiloxane.

8. The method of claim 1, wherein said polymerizable composition further comprises one or more comonomers selected from the group consisting of monofunctional, difunctional, and polyfunctional acrylate, methacrylate, and vinyl ester monomers and oligomers.

9. The method of claim 8, wherein said comonomers are selected from the group consisting of difunctional and polyfunctional acrylate and methacrylate monomers and oligomers.

10. The method of claim 1 comprising exposing said polymerizable composition to a monochromatic light source having a peak intensity at a wavelength of about 222 nm.

11. The method of claim 1, wherein said monochromatic light source comprises an excimer lamp.

12. The method of claim 11, wherein said monochromatic light source comprises a krypton chloride excimer lamp.

13. The method of claim 1, wherein the aged release value of said release coating as measured by peel adhesion is less than 50 percent greater than the unaged release value of said release coating.

14. A method for producing a pressure sensitive adhesive comprising:

providing a polymerizable composition comprising a free radically polymerizable ethylenically unsaturated monomer; and irradiating said polymerizable composition with a monochromatic light source having a peak intensity at a wavelength of between about 160 nanometers to about 240 nanometers to form a pressure sensitive adhesive.

15. The method of claim 14, wherein said pressure sensitive adhesive comprises a repositionable adhesive.

16. The method of claim 14, further comprising applying said polymerizable composition to a substrate at a thickness of between about 1 micron and about 500 microns prior to irradiation with said monochromatic light source.

17. The method of claim 14, wherein said polymerizable composition further comprises a photoinitiator.

18. The method of claim 14, wherein said polymerizable composition consists essentially of free radically polymerizable ethylenically unsaturated monomers.

19. A method for producing a coating on a substrate comprising:

applying a polymerizable composition comprising a free radically polymerizable ethylenically unsaturated monomer to a surface of a substrate; and irradiating said polymerizable composition with incoherent monochromatic radiation having a peak intensity at a wavelength of between about 160 nanometers to about 240 nanometers to form a polymeric coating.

20. The method of claim 19, wherein said peak intensity is at a wavelength of about 222 nanometers.

21. The method of claim 19, wherein said polymeric coating comprises a primer for an adhesive.

22. The method of claim 19, wherein said polymeric coating comprises a pressure sensitive adhesive.

23. The method of claim 22, wherein said pressure sensitive adhesive comprises a repositionable adhesive.

24. The method of claim 19, wherein said polymeric coating comprises a release coating.

* * * * *